United States Patent
Park

(10) Patent No.: US 10,414,263 B2
(45) Date of Patent: Sep. 17, 2019

(54) TRANSMISSION FOR VEHICLE

(71) Applicant: HYUNDAI MOTOR COMPANY, Seoul (KR)

(72) Inventor: Jong Yun Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 520 days.

(21) Appl. No.: 15/236,031

(22) Filed: Aug. 12, 2016

(65) Prior Publication Data

US 2017/0291484 A1    Oct. 12, 2017

(30) Foreign Application Priority Data

Apr. 8, 2016    (KR) .................. 10-2016-0043700

(51) Int. Cl.
*F16H 3/089*    (2006.01)
*B60K 6/547*    (2007.10)
(Continued)

(52) U.S. Cl.
CPC .............. *B60K 6/547* (2013.01); *B60K 6/387* (2013.01); *B60K 6/48* (2013.01); *B60W 10/113* (2013.01); *B60W 30/19* (2013.01); B60K 2006/4816 (2013.01); B60K 2006/4825 (2013.01); B60Y 2200/92 (2013.01); B60Y 2400/42 (2013.01); *F16H 3/089* (2013.01);
(Continued)

(58) Field of Classification Search
CPC . F16H 3/089; F16H 2200/0039; B60K 6/547; B60K 6/387; B60K 6/48; B60K 2006/4816; B60K 2006/4825
USPC .......................................................... 74/661
See application file for complete search history.

(56) References Cited

U.S. PATENT DOCUMENTS 9,381,905 B2 *    7/2016    Fremau ................. B60K 6/48
9,410,601 B2 *    8/2016    Fremau ................. B60K 6/48
(Continued)

FOREIGN PATENT DOCUMENTS

KR    10-1999-0083546 A    11/1999
KR    10-2007-0012445 A    1/2007
(Continued)

OTHER PUBLICATIONS

Korean Office Action issued dated May 18, 2017, issued in Korean Patent Application No. 10-2016-0043700.

*Primary Examiner* — William C Joyce
(74) *Attorney, Agent, or Firm* — Morgan, Lewis & Bockius LLP

(57) ABSTRACT

A transmission for a vehicle includes a first input shaft installed to receive power from an engine, a second input shaft concentrically disposed with the first input shaft and installed to receive power from a motor, an output shaft disposed in parallel with the first input shaft and the second input shaft, a first synchronizer provided at the first input shaft to selectively connect the first input shaft and the second input shaft, a first stage driving gear and a second stage driving gear provided at the second input shaft, a first stage driven gear and a second stage driven gear disposed at the output shaft to be freely rotated and meshed with the first stage driving gear and the second stage driving gear, respectively, to form a first stage shift ratio and a second stage shift ratio, and a second synchronizer installed to selectively connect any one of the first stage driven gear and the second stage driven gear with the output shaft.

4 Claims, 10 Drawing Sheets

(51) Int. Cl.
 *B60K 6/387* (2007.10)
 *B60K 6/48* (2007.10)
 *B60W 10/113* (2012.01)
 *B60W 30/19* (2012.01)

(52) U.S. Cl.
 CPC ... *F16H 2200/0039* (2013.01); *Y02T 10/6221* (2013.01); *Y02T 10/6252* (2013.01); *Y10S 903/914* (2013.01); *Y10S 903/919* (2013.01)

(56) References Cited

U.S. PATENT DOCUMENTS

| | | | |
|---|---|---|---|
| 2006/0021456 A1* | 2/2006 | Hughes | B60K 6/36 74/340 |
| 2008/0254932 A1 | 10/2008 | Heinzelmann | |
| 2011/0239820 A1* | 10/2011 | Shibahata | B60K 6/48 74/665 L |
| 2013/0186233 A1* | 7/2013 | Kaltenbach | B60K 6/442 74/661 |
| 2014/0290592 A1* | 10/2014 | Vignon | B60K 6/48 123/2 |
| 2016/0091056 A1* | 3/2016 | Kim | F16H 61/684 74/661 |
| 2016/0144704 A1* | 5/2016 | Ketfi-Cherif | B60K 6/36 74/661 |

FOREIGN PATENT DOCUMENTS

| KR | 10-2012-0005101 A | 1/2012 |
|---|---|---|
| KR | 10-2013-0115618 A | 10/2013 |
| KR | 10-2014-0007453 A | 1/2014 |
| KR | 10-1362059 B1 | 2/2014 |
| KR | 10-1601472 B1 | 3/2016 |

\* cited by examiner

[FIG. 1]
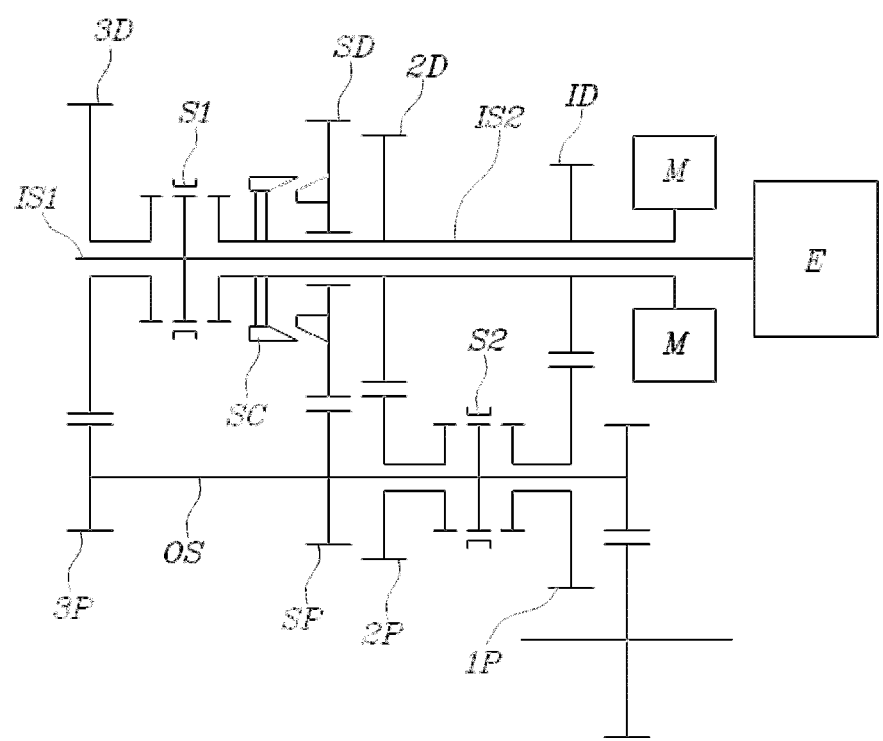

[FIG. 2A]
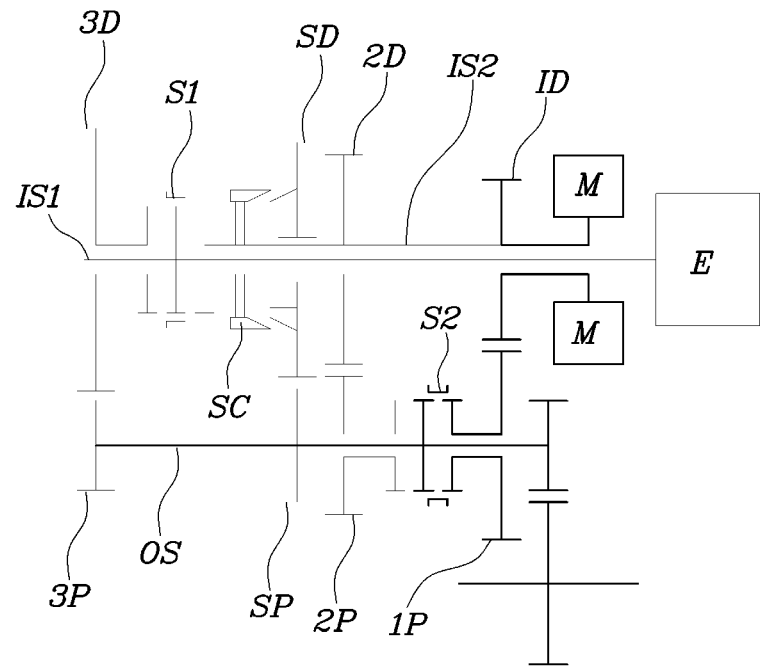
[FIG. 2B]
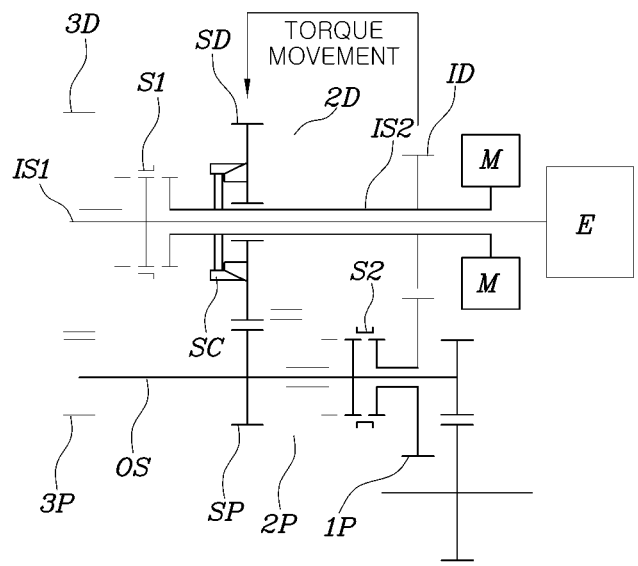

[FIG. 2C]
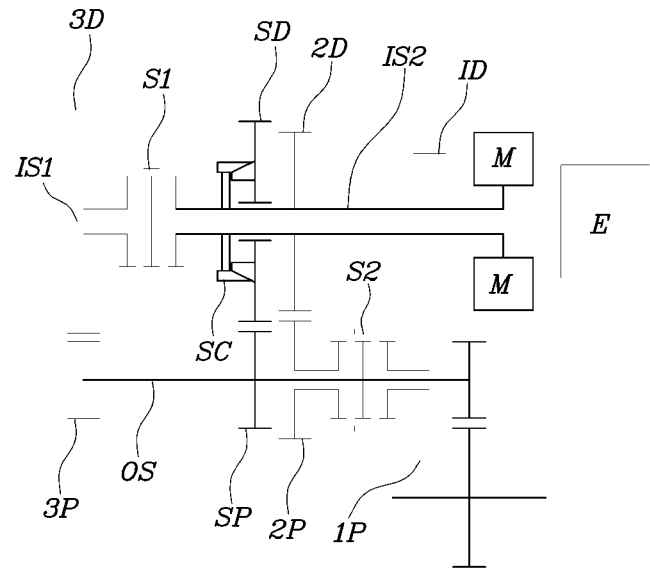
[FIG. 2D]
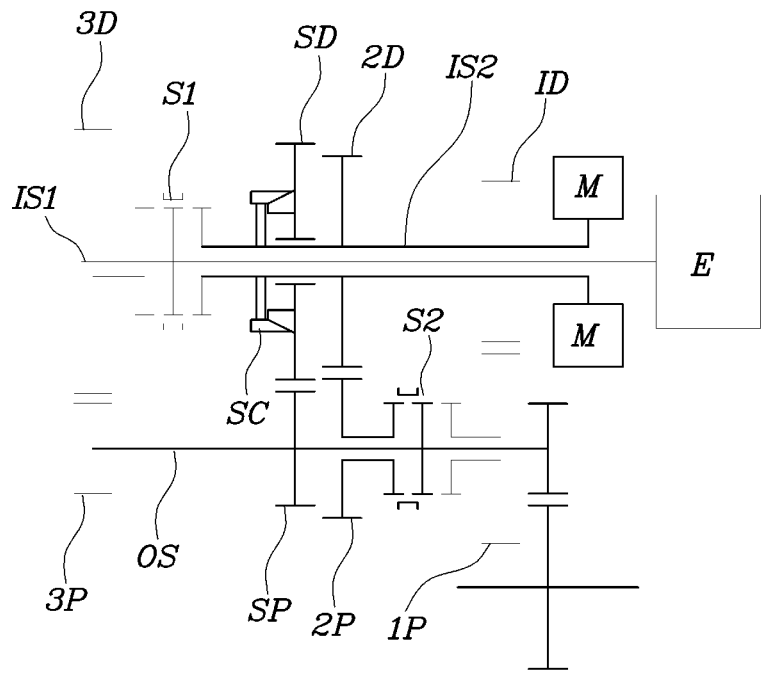

[FIG. 2E]
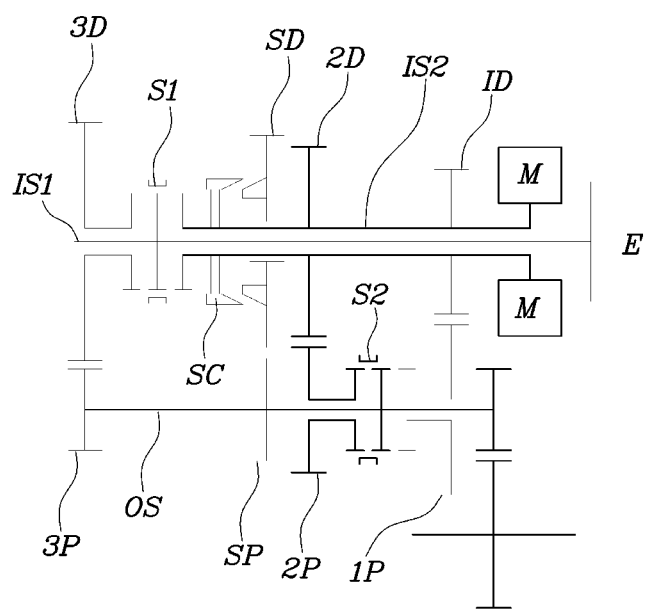

[FIG.3A]
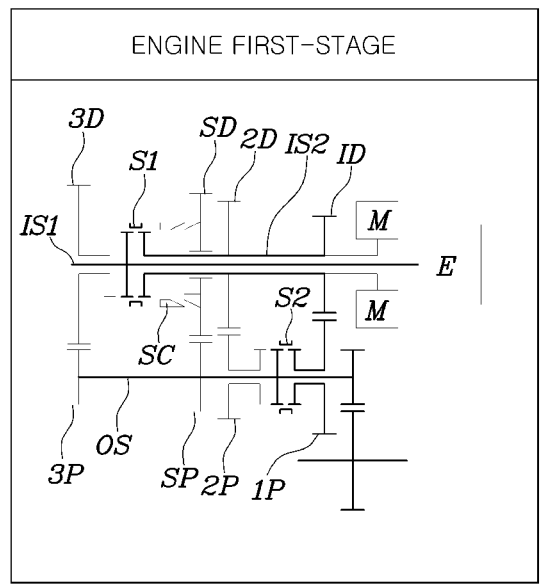
[FIG. 3B]
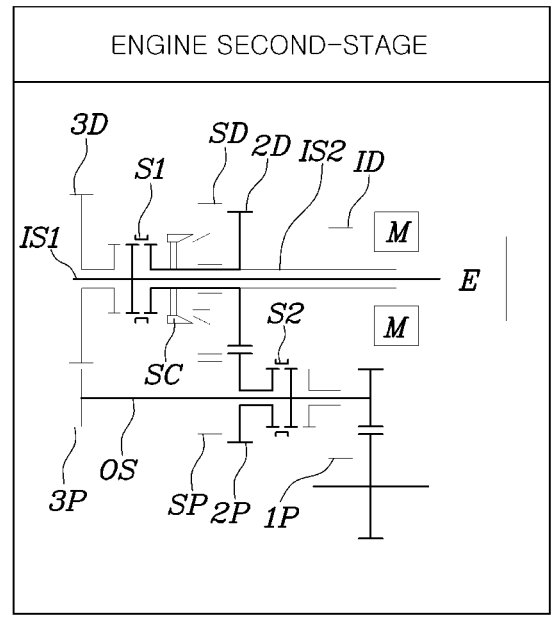

[FIG. 3C]
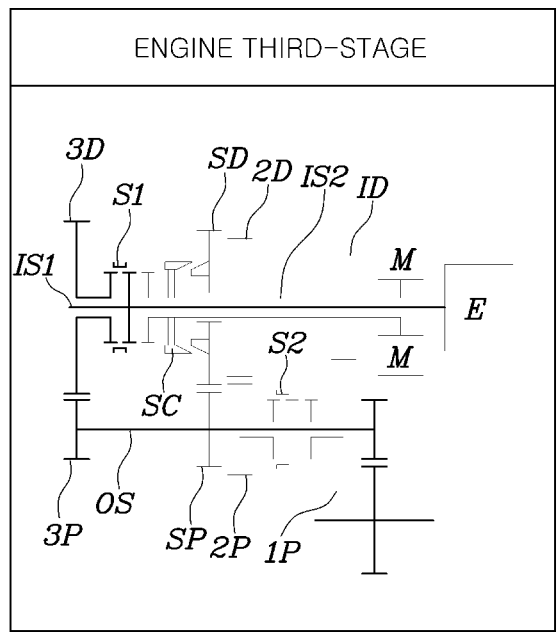

[FIG. 4A]
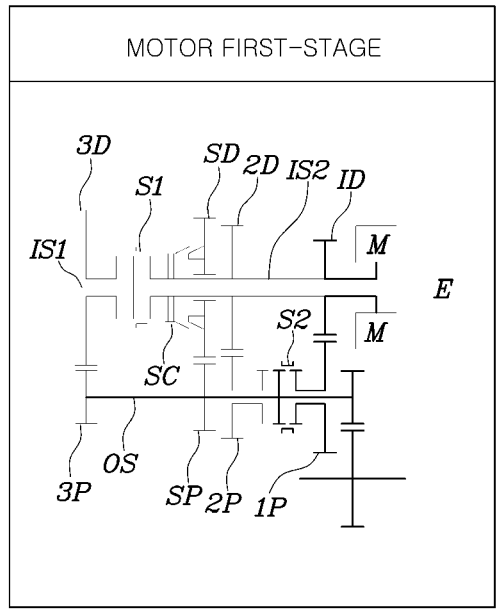
[FIG. 4B]
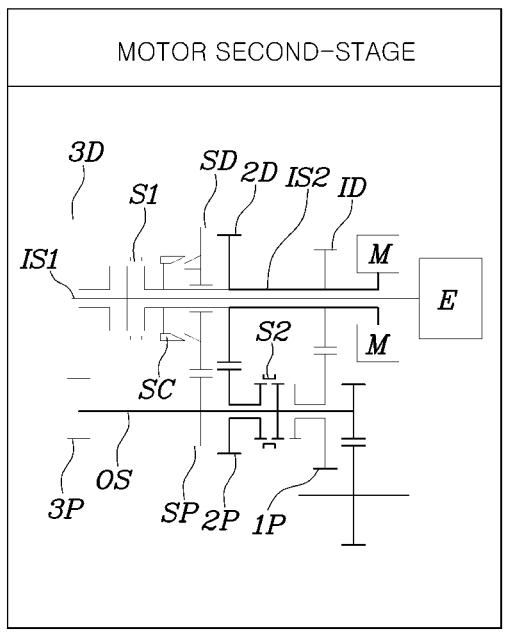

[FIG. 5A]
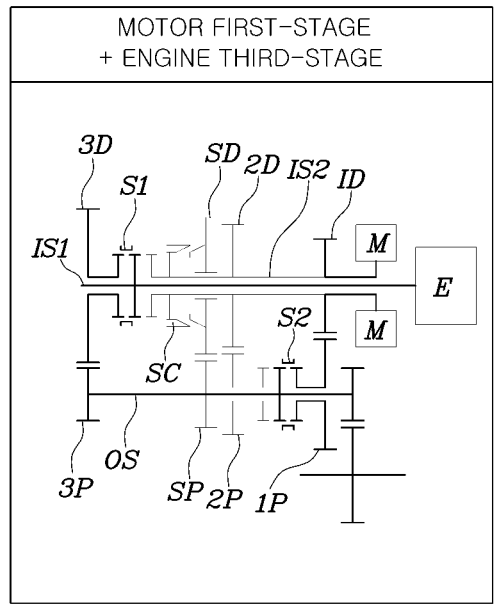
[FIG. 5B]
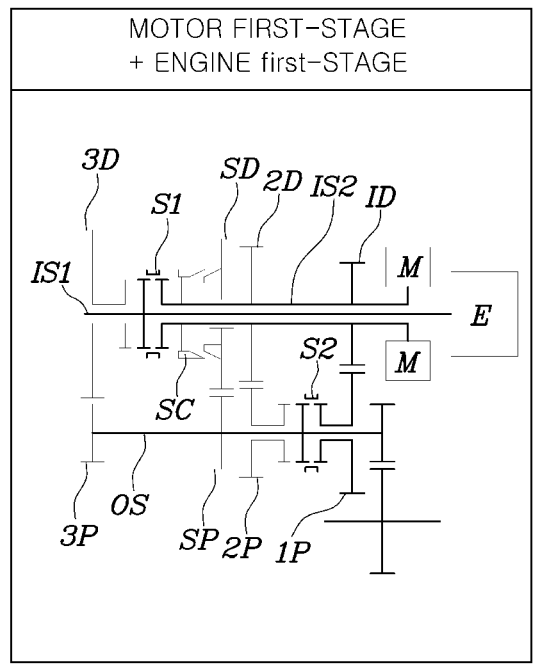

[FIG. 5C]
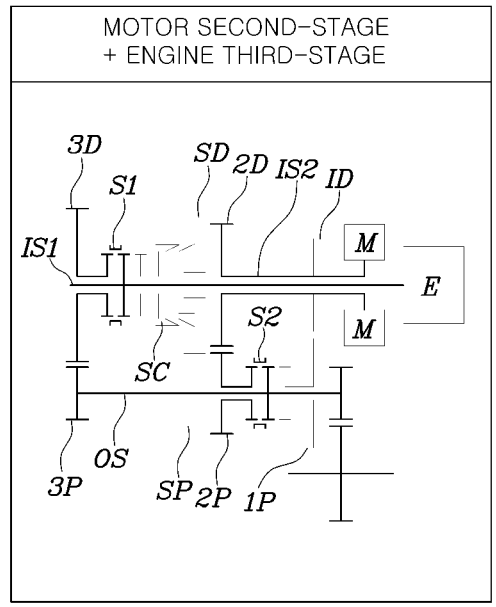
[FIG. 5D]
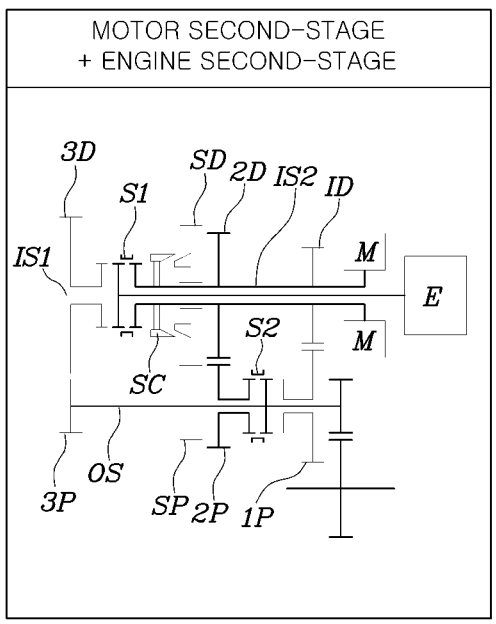

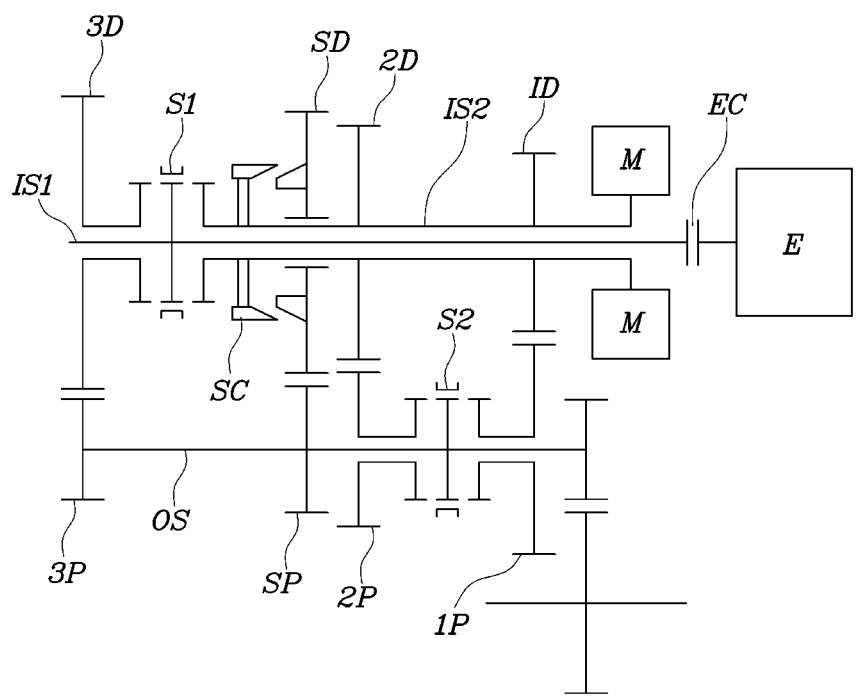
[FIG. 6]

TRANSMISSION FOR VEHICLE

CROSS REFERENCE TO RELATED APPLICATION

The present application claims the benefit of priority to Korean Patent Application No. 10-2016-0043700, filed on Apr. 8, 2016 with the Korean Intellectual Property Office, the entire contents of which is incorporated herein for all purposes by this reference.

TECHNICAL FIELD

The present disclosure relates to a transmission for a vehicle capable of minimizing transmission weight by reducing the number of parts while realizing a multi-stage transmission.

BACKGROUND

Generally, an electric vehicle is driven by delivering rotational power generated from an electric motor, which is driven by electricity, to driving wheels.

Conventionally, the power transfer structure, which drives driving wheels by simply decelerating the power generated from an electric motor via a decelerator, has been used. Recently, attempts for extending a driving range of a vehicle and improving driving performance have been made by delivering the power from an electric motor to driving wheels more efficiently.

However, in a case that a number of shifting gears are increased for this purpose, the weight and volume of a transmission may be increased such that a fuel efficiency of a vehicle may be reduced. Furthermore, a disconnection of power may occur when shifting through a transmission.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a transmission for a vehicle capable of realizing a multi-stage transmission and minimizing its weight.

The transmission for a vehicle according to the present disclosure in order to achieve the above described object may include a first input shaft installed to receive power from an engine; a second input shaft concentrically disposed with the first input shaft and installed to receive power from a motor; an output shaft disposed in parallel with the first input shaft and the second input shaft; a first synchronizer provided at the first input shaft to selectively connect the first input shaft and the second input shaft; a first stage driving gear and a second stage driving gear provided at the second input shaft; a first stage driven gear and a second stage driven gear disposed at the output shaft to be freely rotated and meshed with the first stage driving gear and the second stage driving gear, respectively, to form a first stage shift ratio and a second stage shift ratio; and a second synchronizer installed to selectively connect any one of the first stage driven gear and the second stage driven gear with the output shaft.

The transmission for a vehicle may further include a servo driving gear installed at the second input shaft to be freely rotated; a servo clutch provided for switching the servo driving gear to the second input shaft to be connected; and a servo driven gear provided at the output shaft to be meshed with the servo driving gear.

The servo clutch may be a cone clutch of which a contacting surface for transferring power is formed in, or of, a conical shape.

The shift ratio of the servo driving gear and the servo driven gear may be smaller than the shift ratio of the first stage driving gear and the first stage driven gear, and the shift ratio of the second stage driving gear and the second stage driven gear.

The transmission for a vehicle may further include a third stage driving gear disposed at the first input shaft to be freely rotated; and a third stage driven gear provided at the output shaft and meshed with the third stage driving gear to form a third stage shift ratio; wherein the third stage driving gear is selectively connected to the first input shaft by the first synchronizer.

The transmission for a vehicle may further include an engine clutch provided to selectively connect the engine and the first input shaft.

According to the transmission for a vehicle configured as described above, the multi-stage shifting is possible, while it is able to minimize its weight, thereby improving the fuel efficiency of a vehicle.

Furthermore, even if shifting is occurred during EV mode driving, it is able to prevent the shifting disconnectedness from being occurred at the servo clutch configuration, thereby improving shift quality.

BRIEF DESCRIPTION OF THE DRAWINGS

The above and other objects, features and advantages of the present disclosure will be more clearly understood from the following detailed description taken in conjunction with the accompanying drawings, in which:

FIG. 1 is a drawing showing a transmission for a vehicle according to an exemplary embodiment of the present disclosure.

FIGS. 2A to 2E are drawings showing operation states of a transmission for a vehicle according to an exemplary embodiment of the present disclosure when shifting from a first stage to a second stage.

FIGS. 3A to 3C are drawings showing operations of shifting stages in engine driving modes of a transmission for a vehicle according to an exemplary embodiment of the present disclosure.

FIGS. 4A and 4B are drawings showing operations of shifting stages in EV driving modes of a transmission for a vehicle according to an exemplary embodiment of the present disclosure.

FIGS. 5A to 5D are drawings showing operations of shifting stages in HEV driving modes of a transmission for a vehicle according to an exemplary embodiment of the present disclosure.

FIG. 6 is a drawing showing a transmission for a vehicle according to an exemplary embodiment of the present disclosure.

DETAILED DESCRIPTION

Hereinafter, a transmission for a vehicle according to an exemplary embodiment of the present disclosure will be described with reference to the accompanying drawings.

FIG. 1 is a drawing showing a transmission for a vehicle according to an exemplary embodiment of the present disclosure. Referring to FIG. 1, the transmission for a vehicle may include a first input shaft IS1 installed to receive power from an engine E; a second input shaft IS2 concentrically disposed with the first input shaft IS1 and installed to receive power from a motor M; an output shaft OS disposed in parallel with the first input shaft IS1 and the second input shaft IS2; a first synchronizer S1 provided at the first input shaft IS1 to selectively connect the first input shaft IS1 and the second input shaft IS2; a first stage driving gear 1D and a second stage driving gear 2D provided at the second input shaft IS2; a first stage driven gear 1P and a second stage driven gear 2P disposed at the output shaft OS to be freely rotated and meshed with the first stage driving gear 1D and the second stage driving gear 2D, respectively, to form a first stage shift ratio and a second stage shift ratio; and a second synchronizer S2 installed to selectively connect any one of the first stage driven gear 1P and the second stage driven gear 2P with the output shaft OS.

The powers of the engine E and the motor M in a technology may be transferred to the output shaft OS through the first stage driving 1D and the first stage driven gear 1P, or the second stage driving gear 2D and the second stage driven gear 2P. At this time, whether the power of the engine E is transferred to the output shaft OS may be decided by the operation, or state, of the first synchronizer S1.

For example, in a case that the first synchronizer S1 connects the first input shaft IS1 and the second input shaft IS2 to each other, the power of the engine E may be transferred to the first input shaft IS1, the first synchronizer S1 and the second input shaft IS2.

In a case that the first synchronizer S1 does not connect the first input shaft IS1 and the second input shaft IS2, the power of the engine E may not be transferred to the second input shaft IS2 so that the power of the engine E may not be transferred to the output shaft OS and not affect vehicle driving.

In this regard, the engine E and the motor M are provided to share the first stage shift gear and the second stage shift gear so that the weight and volume of the transmission may be reduced by using minimal driving gears applied to the transmission.

The second synchronizer S2 may play a role of transferring the power, which is transferred to the second input shaft IS2 to the output shaft OS.

If the first synchronizer S1 connects the first input shaft IS1 and the second input shaft IS2, the second synchronizer S2 may maintain its neutral state, and then the power of the engine E may be transferred to the motor M to charge, or power, the motor M. Hereinafter, the power transfer according to the operation of the second synchronizer S2 will be described.

Meanwhile, the transmission for a vehicle in a technology further may include a servo driving gear SD installed at the second input shaft IS2 to be freely rotated; a servo clutch SC provided for switching the servo driving gear SD to the second input shaft IS2 to be connected; and a servo driven gear SP provided at the output shaft OS to be meshed with the servo driving gear SD.

The servo clutch SC may be a cone clutch of which a contacting surface for transferring power is formed in a conical shape. The shift ratio of the servo driving gear SD and the servo driven gear SP may be smaller than the shift ratio of the first stage driving gear 1D and the first stage driven gear 1P and the shift ratio of the second stage driving gear 2D and the second stage driven gear 2P.

The servo clutch SC may operate when the second synchronizer S2 is switched from being connected to the first stage driven gear 1P to being connected to the second stage driven gear 2P, or from being connected to the second stage driven gear 2P to being connected to the first stage driven gear 1P, thereby preventing power from disconnecting when the vehicle shifts.

FIGS. 2A to 2E are drawings showing operation states of the transmission for a vehicle according to an exemplary embodiment of the present disclosure when shifting from a first stage to a second stage. As shown in FIG. 2A, if a vehicle is in a EV mode first-stage, the second synchronizer S2 may connect the first stage driven gear 1P to the output shaft OS, the power of the motor M may be transferred to the output shaft OS through the second input shaft IS2, the first stage driving gear 1D, the first stage driven gear 1P and the second synchronizer S2.

If the second stage driving is required to drive the vehicle, as shown in FIG. 2B, the servo clutch SC may be rubbed. Through this process, the torque of the motor M may be transferred to the output shaft OS through the servo clutch SC with a relatively small shifting ratio.

Thereafter, as shown in FIG. 2C, even if the second synchronizer S2 is released to its neutral state, the torque of the motor M may be transferred to the output shaft OS through the servo clutch SC, thereby preventing the disconnected feelings from occurring when shifting.

Thereafter, as shown in FIG. 2D, the synchronizer S2 may be connected to the second stage driven gear 2P. At this time, the torque of the motor M may still be transferred to servo clutch SC with small shifting ratio.

When the shifting is completed, as shown in FIG. 2E, the friction of the servo clutch SC may be released and the power of the motor M may be transferred to the output shaft OS through the second stage driving gear 2D and the second stage driven gear 2P.

As described above, disconnected power is prevented from occurring when shifting from the EV mode first-stage to the EV mode second-stage. However, in addition, the embodiment and process is able to prevent disconnected power from occurring through the servo clutch SC, even when shifting from the EV mode second-stage to the EV mode first-stage, from the HEV mode first-stage to the HEV mode second-stage and from the HEV mode second-stage to the HEV mode first-stage.

Again, referring to FIG. 1, a transmission for a vehicle of this technology may further include a third stage driving gear 3D installed at the first input shaft IS1 to be freely rotated; and a third stage driven gear 3P provided at the output shaft OS and meshed with the third stage driving gear 3D to form a third stage shifting ratio. The third stage driving gear 3D may be selectively connected to the first input shaft IS1 by the first synchronizer S1.

That is, the first synchronizer S1 may selectively connect the first input shaft IS1 to the second input shaft IS2, the third stage driving gear 3D or a neutral state. Therefore, it is possible to make three shifting stages of the engine E, thereby improving the driving efficiency of a vehicle.

FIGS. 3A to 3C are drawings showing operations of shifting stages in engine driving mode of a transmission for a vehicle according to an exemplary embodiment of the present disclosure. The power transfers in an engine first-stage, an engine second-stage and an engine third-stage are shown in FIGS. 3A, 3B and 3C, respectively.

In a case of an engine first-stage as in FIG. 3A, the first synchronizer S1 may be moved to the right to connect the first input shaft IS1 with the second input shaft IS2, and the second synchronizer S2 may be moved to the right in order for the power of the engine to be transferred to the output shaft OS through the first stage driving gear 1D and the first stage driven gear 1P.

FIG. 3B shows an engine second-stage, the first synchronizer S1 may be moved to the right and the second synchronizer S2 may be moved to the left in order for the power of the engine to be transferred to the output shaft OS through the second stage driving gear 2D and the second stage driven gear 2P.

FIG. 3C shows operations of a transmission in an engine third-stage, the first synchronizer S1 may be moved to the left and the second synchronizer S2 may be operated to its neutral state in order for the power of the engine to be transferred to the output shaft OS through the third stage driving gear 3D and the third stage driven gear 3P.

FIGS. 4A and 4B are drawings showing operations of shifting stages in EV driving modes of a transmission for a vehicle according to an exemplary embodiment of the present disclosure.

FIG. 4A shows operations of the transmission in a motor first-stage, the first synchronizer S1 may be in its neutral state and the second synchronizer S2 may be moved to the right in order for only the power of the motor M to be transferred to the output shaft OS through the first stage driving gear 1D and the first stage driven gear 1P so that the EV first-stage driving mode is realized.

FIG. 4B shows operations of a transmission in a motor second-stage, the first synchronizer S1 may be in its neutral state and the second synchronizer S2 may be moved to the left in order for the power of the motor M to be transferred to the output shaft OS through the second stage driving gear 2D and the second stage driven gear 2P so that the EV second-stage driving mode is realized.

FIGS. 5A to 5D are drawings showing operations of shifting stages in HEV driving modes of a transmission for a vehicle according to an exemplary embodiment of the present disclosure.

FIG. 5A shows operations of a transmission when an HEV mode is operated with the engine third-stage and the motor first-stage, the first synchronizer S1 may be moved to the left and the second synchronizer S2 may be moved to the right in order for the power of the engine E to be transferred to the output shaft OS through the third stage driving gear 3D and the third stage driven gear 3P, and the power of the motor M to be transferred to the output shaft OS through the first stage driving gear 1D and the first stage driven gear 1P.

FIG. 5B shows operations of a transmission when an engine E and the motor M are driven at first stage. The first synchronizer S1 and the second synchronizer S2 may be moved to the left in order for the powers of the engine E and the motor M to be transferred to the output shaft OS through the first stage driving gear 1D and the first stage driven gear 1P.

FIG. 5C shows operations of the transmission when an HEV mode is operated with an engine third-stage and the motor second-stage, the first synchronizer S1 and the second synchronizer S2 may be moved to the left in order for the power of the engine E to be transferred to the output shaft OS through the third stage driving gear 3D and the third stage driven gear 3P, and the power of the motor M to be transferred to the output shaft OS through the second stage driving gear 2D and the second stage driven gear 2P.

FIG. 5D shows operations of a transmission when an HEV mode is operated with the engine second-stage and the motor second-stage. The first synchronizer S1 may be moved to the right and the second synchronizer S2 may be moved to the left in order for the powers of the engine E and motor M to be transferred to the output shaft OS through the second stage driving gear 2D and the second stage driven gear 2P, thereby realizing the HEV second-stage driving mode.

As described above, the present technology is able to accomplish various driving modes according to the vehicle conditions and vehicle driving with maximal efficiency, thereby improving marketability of a vehicle and reducing fuel consumption.

FIG. 6 is a drawing showing a transmission for a vehicle according to an exemplary embodiment of the present disclosure. Referring to FIG. 6, a transmission for a vehicle may further include an engine clutch EC provided so as to selectively connect the engine E and the first input shaft IS1. Therefore, it is possible to prevent a shock from occurring when the first synchronizer Si is operated by using the engine clutch EC.

According to a transmission for a vehicle configured as described above, multi-stage shifting is possible, while being able to minimize weight, thereby improving the fuel efficiency of a vehicle.

Furthermore, even if vehicle shifting occurs during EV mode driving, the system and process is able to prevent the disconnected shifting from occurring by the servo clutch configuration, thereby improving shift quality.

Although embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:
1. A transmission for a vehicle comprising:
   a first input shaft installed to receive power from an engine;
   a second input shaft concentrically disposed with the first input shaft and installed to receive power from a motor;
   an output shaft disposed in parallel with the first input shaft and the second input shaft;
   a first synchronizer provided at the first input shaft to selectively connect the first input shaft and the second input shaft;
   a first stage driving gear and a second stage driving gear provided at the second input shaft;
   a first stage driven gear and a second stage driven gear disposed at the output shaft to be freely rotated and meshed with the first stage driving gear and the second stage driving gear, respectively, to form a first stage shift ratio and a second stage shift ratio;
   a second synchronizer installed to selectively connect any one of the first stage driven gear and the second stage driven gear with the output shaft;
   a servo driving gear installed at the second input shaft to be freely rotated;
   a servo clutch provided for switching the servo driving gear to the second input shaft to be connected;
   a servo driven gear provided at the output shaft to be meshed with the servo driving gear;
   a third stage driving gear disposed at the first input shaft to be freely rotated; and a third stage driven gear provided at the output shaft and meshed with the third stage driving gear to form a third stage shift ratio;

wherein the third stage driving gear is selectively connected to the first input shaft by the first synchronizer.

2. The transmission for a vehicle of claim 1, further comprising an engine clutch provided to selectively connect the engine and the first input shaft.

3. The transmission for a vehicle of claim 1, wherein the servo clutch is a cone clutch of which a contacting surface for transferring power is formed of a conical shape.

4. The transmission for a vehicle of claim 1, wherein the shift ratio of the servo driving gear and the servo driven gear is smaller than the shift ratio of the first stage driving gear and the first stage driven gear, and the shift ratio of the second stage driving gear and the second stage driven gear.

* * * * *